Patented June 10, 1924.

1,496,792

UNITED STATES PATENT OFFICE.

HARLAN L. TRUMBULL, OF HUDSON, AND HERBERT A. WINKELMANN, OF AKRON, OHIO, ASSIGNORS TO THE B. F. GOODRICH COMPANY, OF NEW YORK, N. Y., A CORPORATION OF NEW YORK.

COMPOSITION OF MATTER AND METHOD OF PRODUCING THE SAME.

No Drawing. Application filed September 19, 1923. Serial No. 663,695.

*To all whom it may concern:*

Be it known that we, HARLAN L. TRUMBULL and HERBERT A. WINKELMANN, citizens of the United States, residing at Hudson and Akron, respectively, in the county of Summit and State of Ohio, have invented a certain new and useful Composition of Matter and Method of Producing the Same, of which the following is a specification.

This invention relates to the vulcanization of rubber and similar substances by the aid of organic accelerators, and more particularly to the use of accelerators which impart age resisting properties to the vulcanized product.

A distinct disadvantage of disubstituted guanidines such as diphenylguanidine or di-o-tolylguanidine as accelerators is the poor ageing observed in vulcanized rubber mixes wherein they have been used.

The object of our invention is inexpensively to provide a new class of accelerators, derived from dialkylated guanidines, which in addition to their action as accelerators will also impart age resisting properties to the vulcanized product.

Aldehydes react with guanidines to produce resin like products which we find to be valuable accelerators and age resisters. While the furfuryl aldehyde and other closed chain aldehyde reaction products are found to be valuable in this respect, the reaction products of open chain aldehydes such as formaldehyde or paraldehyde, are better and the reaction products of the higher members of the series, such as butylaldehyde, heptaldehyde or aldol, are still more effective in imparting age resisting qualities to the vulcanized product, in addition to their action as accelerators.

For the preparation of our new type of accelerators the aldehyde and the guanidine are mixed and caused to react by subjecting them to heat under suitable conditions depending on the properties of the constituents, such as volatility, melting point or temperature of reaction. Inactive solvents may or may not be used, as desired. The aldehyde and the guanidine are preferably mixed in such proportions as to provide for a reaction of one mol of the aldehyde with one mol of the guanidine. The reaction product is then heated to remove solvent, water, or volatile reaction products. Heating is preferably continued until the melt on cooling has a consistency, approximating that of rosin, such that it may be pulverized, will soften on the rubber mill and may be thoroughly incorporated into the rubber.

The age resisting properties of these guanidine derivatives are shown by the following quick-ageing tests which show the changes of tensile strength of the vulcanized rubber caused by heating in an ageing oven at 70° C. The standard mix comprises rubber—100, zinc oxide—10, sulfur—5 and accelerator—0.8 parts by weight. The control consists of unreacted diphenylguanidine, and the other accelerators or age resisters are the reaction products of diphenylguanidine with the aldehydes specified:

| | Control. | | Aldol. | | Formaldehyde. | | Furfuraldehyde. | |
|---|---|---|---|---|---|---|---|---|
| Cure in minutes at 287° F. | 30 | | 30 | | 60 | | 60 | |
| Days in oven at 158° F. | Tensile, lbs./sq. inch. | Elongation, per cent. | Tensile, lbs./sq. inch. | Elongation, per cent. | Tensile, lbs./sq. inch. | Elongation, per cent. | Tensile, lbs./sq. inch. | Elongation, per cent. |
| 0 | 2750 | 850 | 2875 | 820 | 3100 | 850 | 2650 | 840 |
| 4 | 3125 | 850 | 3075 | 840 | 3650 | 840 | 3150 | 790 |
| 7 | 2750 | 810 | 3175 | 850 | 3500 | 830 | 3300 | 780 |
| 10 | 1925 | 890 | 3125 | 860 | 3075 | 800 | 2750 | 760 |
| 14 | 1600 | 870 | 2500 | 850 | 2400 | 790 | 1500 | 670 |

Di-o-tolyl guanidine as compared with its aldehyde condensation products also shows ageing power in favor of the aldehyde derivatives. The butylaldehyde derivative and the heptaldehyde derivative are especially valuable age resisting accelerators. We find the aldol derivative, however, to be preferable to all others.

We do not wholly limit our claims to any specific method of preparation of aldehyde condensation products nor to definite amounts of accelerator in the rubber mix, as such factors will vary with each ingredient used in the preparation of the accelerator or with the various compounding ingredients which may be used in the rubber mix.

We claim:

1. The method of producing a composition of matter which comprises mixing rubber or similar material with a vulcanizing agent and the condensation product of an aldehyde with a disubstituted guanidine, and vulcanizing the mix.

2. The method of producing a composition of matter which comprises mixing rubber or similar material with a vulcanizing agent and the condensation product of an aldehyde with diphenylguanidine and vulcanizing the mix.

3. The method of producing a composition of matter which comprises mixing rubber or similar material with a vulcanizing agent and the condensation product of an open chain aldehyde with a disubstituted guanidine and vulcanizing the mix.

4. The method of producing a composition of matter which comprises mixing rubber or similar material with a vulcanizing agent and the condensation product of an open chain aldehyde with diphenylguanidine and vulcanizing the mix.

5. The method of producing a composition of matter which comprises mixing rubber or similar material with a vulcanizing agent and the condensation product of a hydroxyaldehyde with a disubstituted guanidine and vulcanizing the mix.

6. The method of producing a composition of matter which comprises mixing rubber or similar material with a vulcanizing agent and the condensation product of a hydroxyaldehyde with diphenylguanidine and vulcanizing the mix.

7. The method of producing a composition of matter which comprises mixing rubber or similar material with a vulcanizing agent and the condensation product of aldol with a disubstituted guanidine and vulcanizing the mix.

8. The method of producing a composition of matter which comprises mixing rubber or similar material with a vulcanizing agent and the condensation product of aldol with diphenylguanidine and vulcanizing the mix.

9. A composition of matter comprising the vulcanization product of a mixture of rubber or the like with a vulcanizing agent and the condensation product of an aldehyde with a disubstituted guanidine.

10. A composition of matter comprising the vulcanization product of a mixture of rubber or the like with a vulcanizing agent and the condensation product of an aldehyde with diphenylguanidine.

11. A composition of matter comprising the vulcanization product of a mixture of rubber or the like with a vulcanizing agent and the condensation product of an open chain aldehyde with a disubstituted guanidine.

12. A composition of matter comprising the vulcanization product of a mixture of rubber or the like with a vulcanizing agent and the condensation product of an open chain aldehyde with diphenylguanidine.

13. A composition of matter comprising the vulcanization product of a mixture of rubber or the like with a vulcanizing agent and the condensation product of a hydroxyaldehyde with a disubstituted guanidine.

14. A composition of matter comprising the vulcanization product of a mixture of rubber or the like with a vulcanizing agent and the condensation product of a hydroxyaldehyde with diphenylguanidine.

15. A composition of matter comprising the vulcanization product of a mixture of rubber or the like with a vulcanizing agent and the condensation product of aldol with a disubstituted guanidine.

16. A composition of matter comprising the vulcanization product of a mixture of rubber or the like with a vulcanizing agent and the condensation product of aldol with diphenylguanidine.

In witness whereof we have hereunto set our hands this 11th day of September, 1923.

HARLAN L. TRUMBULL.
HERBERT A. WINKELMANN.